United States Patent [19]
Negishi

[11] 3,809,992
[45] May 7, 1974

[54] CIRCUIT FOR STORING A REPRESENTATION OF AN INCIDENT LIGHT QUANTITY IN A CAMERA
[75] Inventor: Masataka Negishi, Urawa, Japan
[73] Assignee: Mamiya Koki Kabushiki Kaisha, Tokyo-to, Japan
[22] Filed: Nov. 13, 1972
[21] Appl. No.: 305,823

[52] U.S. Cl............... 95/10 CE, 95/42, 95/53 E
[51] Int. Cl............................ G03b 7/08, G01j 1/46
[58] Field of Search .......... 95/10 C, 10 CE, 10 CT, 95/53 EA, 53 EB, 42, 10 CD

[56] References Cited
UNITED STATES PATENTS
3,679,905   7/1972   Watanabe................... 95/10 CT X
3,620,143   11/1971  Burgarella.................. 95/10 CE
3,678,826   7/1972   Mori et al.................. 95/10 CT
3,641,891   2/1972   Burgarella.................. 95/10 CE
3,626,825   12/1971  Years....................... 95/10 CE Primary Examiner—Joseph F. Peters, Jr.
Attorney, Agent, or Firm—Wenderoth, Lind & Ponack

[57] ABSTRACT

A circuit for storing the amount of incident light in a camera which comprises: a photoelectric conversion circuit constituted by a photosensitive element and a resistor to produce a divided voltage corresponding to the amount of light incident on the camera; an integration circuit formed by an operational amplifier and a capacitor; and switching means operating to apply the divided voltage between the input and output terminals of the operational amplifier and then to terminate the application of the divided voltage, whereby the amount of light incident on the camera before the shutter is operated is stored and maintained in the integration circuit and is utilized to accurately control the operation of the shutter.

7 Claims, 6 Drawing Figures

CIRCUIT FOR STORING A REPRESENTATION OF AN INCIDENT LIGHT QUANTITY IN A CAMERA

BACKGROUND OF THE INVENTION

This invention relates to electronic shutter cameras and more particularly to a circuit for storing a voltage representing the quantity of incident light which circuit is employed, for instance, in a camera having a through-the-lens metering system (hereinafter referred to as a TTL camera).

In general, in a TTL camera, its photosensitive element is provided in the optical system of the view finder, and when the shutter is operated, the mirror provided for reflecting incident light to the view finder is moved thereby to intercept the incident light, as a result of which the resistance of the photosensitive element is changed and the operation of the shutter therefore becomes inaccurate.

SUMMARY OF THE INVENTION

A first object of the invention accordingly is to provide a circuit for storing a voltage representing the incident light quantity in a camera in which the light quantity incident to the camera before the shutter is operated is stored in an integration circuit comprising a capacitor and an operational amplifier, and the incident light quantity thus stored is utilized to control the operation of the shutter.

A second object of the invention is to provide a circuit for storing the incident light quantity in a camera which circuit is relatively simple yet effective in storing the light quantity incident to the camera.

A third object of the invention is to provide a circuit for storing the incident light quantity in a camera in which the temperature characteristic, reduced-voltage compensation characteristic and linearity of the circuit over a wide range are secured whereby the light quantity incident to the camera is accurately stored.

A fourth object of the invention is to provide a circuit for storing the incident light quantity in a camera in which the potential at the input terminal of an operational amplifier provided therein is theoretically equal to zero, whereby the input side of a capacitor connected in parallel with the operational amplifier can be connected to the ground thereby to quickly store the light quantity incident to the camera and is then connected to the input side of the operational amplifier thereby to retain the light quantity thus stored.

The foregoing objects and other objects as well as the characteristic features of the invention will become more apparent from the following detailed description and the appended claims when read in conjunction with the accompanying drawings, in which like parts are designated by like reference symbols.

DETAILED DESCRIPTION OF THE INVENTION

Figure 1:
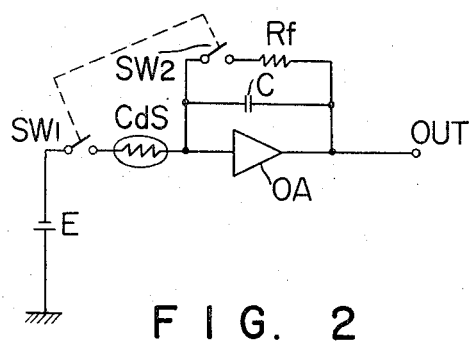
FIG. 1 is a schematic diagram illustrating a first example of the circuit for storing light quantity according to the invention.

With reference to FIG. 1, there is shown a first example of the circuit for storing a light quantity according to the invention, which comprises: an operational amplifier OA; a photo-sensitive element CdS connected, as an input resistance, to the operational amplifier OA; a d.c. power source E connected through switching mean $SW_1$ to the photo-sensitive element CdS; a capacitor C connected between the input and output sides of the amplifier OA; and a feedback resistor Rf connected through switching means $SW_2$ between the input and output sides of the amplifier OA. The combination of the photosensitive element CdS and the capacitor C forms an integration circuit. The switching means $SW_1$ and $SW_2$ are operated at the same time thereby to simultaneously open or close the input circuit and feedback circuit of the operational amplifier OA.

The circuit for storing light quantity, described above, stores a signal corresponding to the light quantity incident to a camera when the switching means $SW_1$ and $SW_2$ are closed. This signal is a divided voltage which is obtained through a voltage divider consisting of the feedback resistance Rf and the input resistance, that is, the resistance Rx of the photosensitive element CdS. The divided voltage is represented by the following equation.

Divided voltage = (input voltage) × (feedback resistance)/(input resistance)

Hereinafter, the signal or the divided voltage to be stored in the circuit will be referred to as a storage voltage when applicable. Therefore, the magnitude of the storage voltage varies with the incident light quantity.

The operation of the circuit described above will be described with consideration of its principle. The fact that a voltage is stored or maintained in a capacitor means that the electric charge in the capacitor is not transferred. If, in the circuit, the capacitor C and the operational amplifier OA are ideal ones, it can be considered that, when the switching means $SW_1$ and $SW_2$ are opened, no electric current flows to the input terminal of the ideal operational amplifier OA, and no transfer of the electric charge is therefore caused.

However, in the actual operational amplifier, it is necessary to supply some electric current to it in order to bias the semiconductor elements thereof. Such an electric current is supplied to the operational amplifier OA from a circuit (not shown) which is designed so that an electric current $I_B$ to be supplied to the operational amplifier OA will be equal to an electric current $I_o$ necessary for the operational amplifier OA, whereby the storage voltage described above is stored in the integration circuit. If the currents $I_o = I_B$ are not equal the storage voltage is raised or lowered. Therefore, the operation for storing the storage voltage (hereinafter referred to as a voltage storing operation) of the circuit becomes erroneous.

In this connection, there are various methods for supplying bias current to an operational amplifier depending on its type. For instance, in some operational amplifiers, the bias current is applied thereto automatically inside thereof, while in some other operational amplifiers, there is almost no need for applying such bias current thereto because field-effect transistors are employed therein.

If, in the circuit shown in FIG. 1, the storage voltage and the incident light quantity are represented by Ex and Lx, respectively, the relationship between the storage voltage Ex and the quantity of incident light Lx can be represented by the following equation.

$$Ex = kLx \quad (Ex = (Rf/Rx) E) \quad\quad (1)$$

where $k$ is a constant.

Therefore, the storage voltage Ex increases as the incident light quantity Lx increases, that is, the storage voltage Ex is proportional to the amount of the incident light.

When the period for storing the storage voltage elapses (hereinafter referred to as a voltae storing period) during which period the switches $SW_1$ and $SW_2$ are closed, these switches $SW_1$ and $SW_2$ are simultaneously opened, as a result of which the input circuit and the feedback circuit of the operational amplifier OA are opened, whereby a signal corresponding to the incident light quantity is stored in the circuit. Thereafter, the signal thus stored is read through suitable means, and the signal thus read is utilized for controlling the camera shutter.

Figure 2:
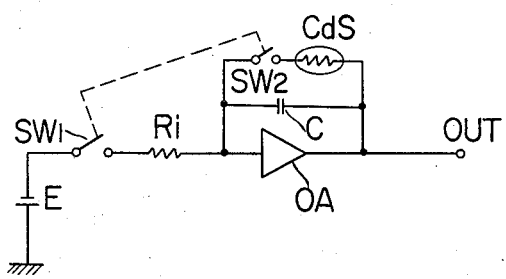
FIG. 2 is a schematic diagram showing a modification of the circuit of FIG. 1.

A second example of the circuit for storing a voltage representive of the amount of incident light according to the invention is illustrated in FIG. 2 which is the same as FIG. 1 except that an input resistor Ri and a photosensitive element CdS are provided in place of the photosensitive element CdS and the feedback resistor Rf of FIG. 1, respectively.

Therefore, in the circuit shown in FIG. 2, the storage voltage varies with the variation of the incident light quantity, and the magnitude of the storage voltage is determined by the resistance of the photosensitive element CdS which is provided as a feedback circuit, and by a divided voltage.

In other words, when the switches $SW_1$ and $SW_2$ are closed, the voltage storing operation is carried out in the operational amplifier OA according to the time constant CRi determined by the input resistance Ri and the capacitor C. The degree of the variation of the storage voltage with respect to time is always maintained at a predetermined value, and the magnitude of the storage voltage is determined by the resistance of the photosensitive element CdS inserted in the feedback circuit of the operational amplifier OA. This can be represented by the following equation:

$$Ex = k \times (1/Lx) \quad (Ex = (Rx/Ri) E) \quad\quad (2)$$

Where $k$ is a constant.

Therefore, the magnitude of the storage voltage decreases with an increase in the incident quantity of light.

Figure 3:
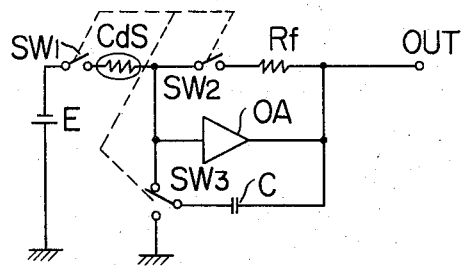
FIGS. 3 and 4 are schematic diagrams illustrating modifications of the circuits shown in FIGS. 1 and 2, respectively, in each of which circuit diagrams an additional switch is provided for alternately connecting a capacitor to the ground and the input side of an operational amplifier.
Figure 4:
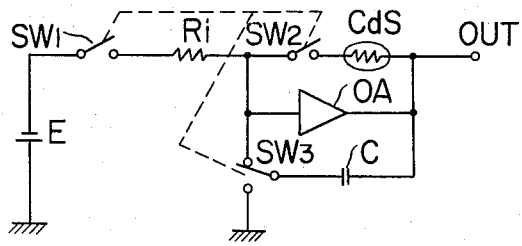

A third example and a fourth example of the circuit for storing the amount of light according to the invention, are shown respectively in FIGS. 3 and 4 which are the same as FIGS. 1 and 2, respectively, except that in each of FIGS. 3 and 4 the input terminals of the capacitors C are made through switching means $SW_3$ to be grounded for the voltage storing period of the circuit, and to be connected to the input terminal of the operational amplifier OA for the other period, and the switches $SW_1$, $SW_2$ and $SW_3$ are operated simultaneously to operate the operational amplifier OA as a linear element.

One specific characteristic common to the circuits illustrated in FIGS. 3 and 4 is the shortening of the voltage storing period, although the voltage storing operations of these circuits are different from each other in that one of these operations is to change the input resistance while the other is to change the linearity coefficient of the linear element described above.

In other words, in each of these circuits, when a voltage of a certain value has been applied to the circuit and the voltage storing operation has been carried out by appropriately operating the switching means $SW_1$, $SW_2$ and $SW_3$, if it is assumed that the variation of the voltage is $|E-Ea|$, the voltage storing period t can be represented by the following equation.

$$t = C \times |E - Ea/J_o|$$

where Io is the maximum charge current.

Therefore, it is possible to make the voltage storing period shorter than that in the first and second examples, and to make the value thereof accurate.

Figure 5:
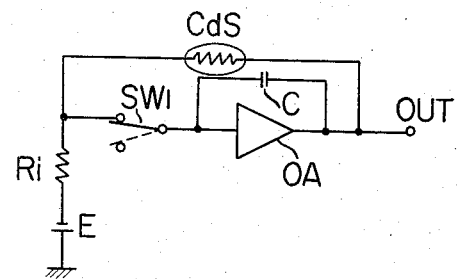
FIG. 5 is a schematic diagram illustrating a fifth example of the circuit for storing light quantity according to the invention in which only one switching means is provided.

FIG. 5 illustrates a fifth example of the circuit for storing a voltage representing the amount of incident light according to the invention, which example is based on the same principle as that described with respect to the aboveexamples but is provided with only one switching means.

The circuit comprises: a power source E; an input resistor Ri connected to the power source E; switching means $SW_1$ connected to the input resistance Ri; an integration circuit comprising a capacitor C and an operational amplifier OA; and a photosensitive element CdS connected in parallel to a series circuit including the switch $SW_1$ and the integration circuit.

In the circuit shown in FIG. 5, the voltage of the power source E is divided by means of the input resistance Ri and the photosensitive element CdS when the switch $SW_1$ is closed (as shown by solid line), and the voltage obtained by the voltage division is stored in the integration circuit formed by the capacitor C and the operational amplifier OA. Then, the voltage thus stored is maintained therein by opening the switch $SW_1$ (as shown by dotted line).

Figure 6:
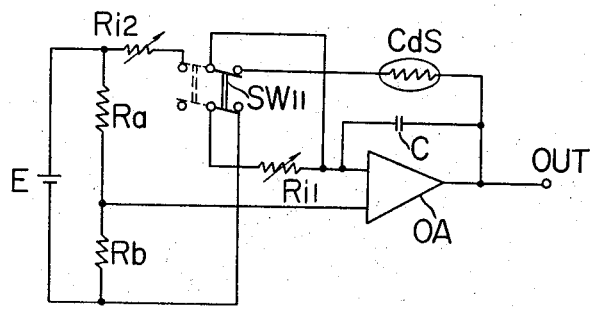
FIG. 6 is also a schematic diagram showing a sixth example of the circuit for storing light quantity according to the invention which is designed for applying the circuit of FIG. 5 to a TTL camera.

FIG. 6 is a circuit designed to apply the circuit of FIG. 5 to the TTL camera, and differs from the circuit of FIG. 5 in that the power source E is provided with a voltage divider consisting of resistors Ra and Rb, switching means $SW_{11}$ is of the double-pole double-throw type, and in that an additional input resistor $Ri_2$ is provided therein.

In the circuit shown in FIG. 6, the voltage of the power source E is divided by the input resistances $Ri_1$ and the photo-sensitive element CdS when the switch $SW_{11}$ is thrown to the position shown by the solid line, and the divided voltage thus obtained is stored in the integration circuit constituted by the capacitor C and an operational amplifier OA. Thereafter, the stored voltage is retained therein by throwing the switch $SW_{11}$ to its other position shown by dotted line.

In this connection, one of the input resistors $Ri_1$ and $Ri_2$ can be used as a resistor for controlling an iris, while the other can be used as a resistor for controlling film sensitivity. The resistors Ra and Rb divide the voltage of the power source E of the photosensitive element OA. Owing to these resistors, the operation of the circuit is equivalent to that in a "two-power-source system" in which two power sources are employed.

Each circuit described hereinbefore is an input circuit. If this input circuit is combined with a proper output circuit or provided with proper reading means, a signal corresponding to the quantity of incident light can be utilized for the control of the shutter.

As is apparent from the above description, in the circuits according to the invention, the photoelectric conversion circuit formed as a resistance type voltage division circuit is combined with the integration circuit. Accordingly, the circuits of the invention are relatively simple, yet effective for storing information relating to the light quantity.

Furthermore, since the operational amplifier is employed in the integration circuit, the temperature characteristic, reduced-voltage compensation characteristic and linearity of the circuit over a wide range is secured, whereby the information as to the light quantity incident on the camera can be stored accurately in the circuit.

In addition, since the potential at the input terminal of the operational amplifier is theoretically equal to zero, this fact is utilized in the processing of the information of the light quantity. That is, during the voltage storing period, the input terminal of the capacitor can be grounded, as a result of which the storage voltage is quickly stored through the low output impedance of the operational amplifier, and during the voltage maintaining period, the input terminal of the capacitor can be connected to the input side of the operational amplifier.

I claim:

1. A circuit for storing a voltage representing the amount of incident light in a camera comprising:
   a photoelectric conversion circuit comprising a photoconductive cell and a fixed resistor connected in series in the recited order and operating to produce a divided voltage corresponding to the light quantity incident on the camera; an integration circuit formed by an operational amplifier and a capacitor connected in parallel with said operational amplifier; and at least one switching means coupled between the photoelectric conversion circuit and the input of the operational amplifier to first apply the divided voltage obtained by the photoelectric conversion circuit between the input and output terminals of the operational amplifier and then to terminate the application of the divided voltage, thereby storing a signal corresponding to the incident light quantity on said capacitor.

2. A circuit for storing a voltage representing the light quantity as claimed in claim 1 in which: the number of said switching means is two; one of said switching means being connected to said fixed resistor in parallel with said operational amplifier; and the other switching means being connected to said photoconductive cell in series therewith.

3. A circuit for storing a voltage representing a light quantity as claimed in claim 2 in which said fixed resistor and said photoconductive cell are positionally reversed with each other.

4. A circuit for storing a voltage representing a light quantity as claimed in claim 2, further comprising:
   additional switching means said additional switching means provided between said capacitor and the input side of said operational amplifier, whereby said signal corresponding to the amount of light is stored in said integration circuit by grounding the input terminal of the capacitor, and said signal is maintained therein by connecting the input terminal of the capacitor to the input terminal of the operational amplifier.

5. A circuit for storing a voltage representing a light quantity as claimed in claim 3 further comprising additional switching means provided between said capacitor and the input side of said operational amplifier, whereby said signal corresponding to the light quantity is stored in said integration circuit by grounding the input terminal of the capacitor, and said voltage is maintained therein by connecting the input terminal of the capacitor to the input terminal of the operational amplifier.

6. A circuit for storing a voltage representing a light quantity as claimed in claim 8 in which the number of said switching means is one, the switching means being connected between the input side of the operational amplifier and the point connecting said fixed resistor to said photoconductive cell.

7. A circuit for storing a voltage representing a light quantity as recited in claim 6, further comprising:
   a power source;
   a voltage divider connected in parallel with said power source to apply a divided voltage to said operational amplifier; and
   said switching means being double pole-double throw.

* * * * *